(12) United States Patent
Ando

(10) Patent No.: US 11,999,253 B2
(45) Date of Patent: Jun. 4, 2024

(54) VEHICLE INFORMATION MANAGEMENT DEVICE AND CHARGING CONTROL METHOD

(71) Applicant: Mitsubishi Electric Corporation, Tokyo (JP)

(72) Inventor: Eisho Ando, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 527 days.

(21) Appl. No.: 17/283,601

(22) PCT Filed: Oct. 15, 2018

(86) PCT No.: PCT/JP2018/038301
§ 371 (c)(1),
(2) Date: Apr. 8, 2021

(87) PCT Pub. No.: WO2020/079728
PCT Pub. Date: Apr. 23, 2020

(65) Prior Publication Data
US 2021/0380010 A1 Dec. 9, 2021

(51) Int. Cl.
*B60L 53/62* (2019.01)
*B60L 58/13* (2019.01)
*B61C 17/06* (2006.01)
*B61L 25/02* (2006.01)

(52) U.S. Cl.
CPC ............ *B60L 53/62* (2019.02); *B60L 58/13* (2019.02); *B61C 17/06* (2013.01); *B61L 25/025* (2013.01);
(Continued)

(58) Field of Classification Search
CPC ...... B60L 53/62; B60L 58/13; B60L 2200/26; B60L 2240/26; B60L 2260/54;
(Continued)

(56) References Cited

FOREIGN PATENT DOCUMENTS

JP 2008054387 A 3/2008
JP 2009171772 A 7/2009
(Continued)

OTHER PUBLICATIONS

Office Action dated May 11, 2021, issued in corresponding Japanese Patent Application No. 2020-551613, 6 pages including 4 pages of English translation.
(Continued)

*Primary Examiner* — Stacy Whitmore
(74) *Attorney, Agent, or Firm* — BUCHANAN INGERSOLL & ROONEY PC

(57) ABSTRACT

A vehicle information management device that executes control of charging a storage battery with power generated in a train, the vehicle information management device includes an information obtainer to obtain information on a current operational state of the train, a storage to store charging control information therein, where in the charging control information, control contents of charging the storage battery with power generated by using an engine to be installed in the train are set correspondingly to an operational state of the train, and a controller to obtain charging control information that matches the current operational state of the train from the storage, and to control charging of the storage battery on the basis of the charging control information obtained.

2 Claims, 4 Drawing Sheets

(52) U.S. Cl.
CPC ....... *B60L 2200/26* (2013.01); *B60L 2240/26* (2013.01); *B60L 2260/54* (2013.01)

(58) Field of Classification Search
CPC ...... B60L 7/10; B60L 50/61; B60L 2240/642; B60L 1/003; B60L 1/02; B60L 2240/34; B60L 2240/62; B61C 17/06; B61L 25/025; B61L 15/0072; Y02T 10/62; Y02T 10/70; Y02T 10/72; Y02T 90/16; Y02T 10/7072; Y02T 30/00; Y02T 90/12
See application file for complete search history.

(56) References Cited

FOREIGN PATENT DOCUMENTS

| | | | | |
|---|---|---|---|---|
| JP | 2014234020 | A | * | 12/2014 |
| JP | 2015172840 | A | | 10/2015 |
| JP | 2016140204 | A | | 8/2016 |
| JP | 2017046379 | A | * | 3/2017 |
| JP | 2017046379 | A | | 3/2017 |
| JP | 6151090 | B2 | * | 6/2017 |
| JP | 6151090 | B2 | | 6/2017 |
| JP | 2017144801 | A | * | 8/2017 |

OTHER PUBLICATIONS

International Search Report (PCT/ISA/210) with translation and Written Opinion (PCT/ISA/237) dated Dec. 25, 2018, by the Japan Patent Office as the International Searching Authority for International Application No. PCT/JP2018-038301. (9 pages).

Office Action dated Feb. 7, 2022, issued in corresponding Indian Patent Application No. 202127016564, 5 pages.

* cited by examiner

| POINT | STATION CODE | DISTANCE FROM STATION | CHARGING RATE | POWER GENERATION |
|---|---|---|---|---|
| #3 | B | 950 | 50 | START |
| #3 | B | 950 | 90 | STOP |
| #2 | B | 500 | 30 | START |
| #2 | B | 500 | 65 | STOP |
| #1 | B | 0 | 25 | START |
| #1 | B | 0 | 50 | STOP |

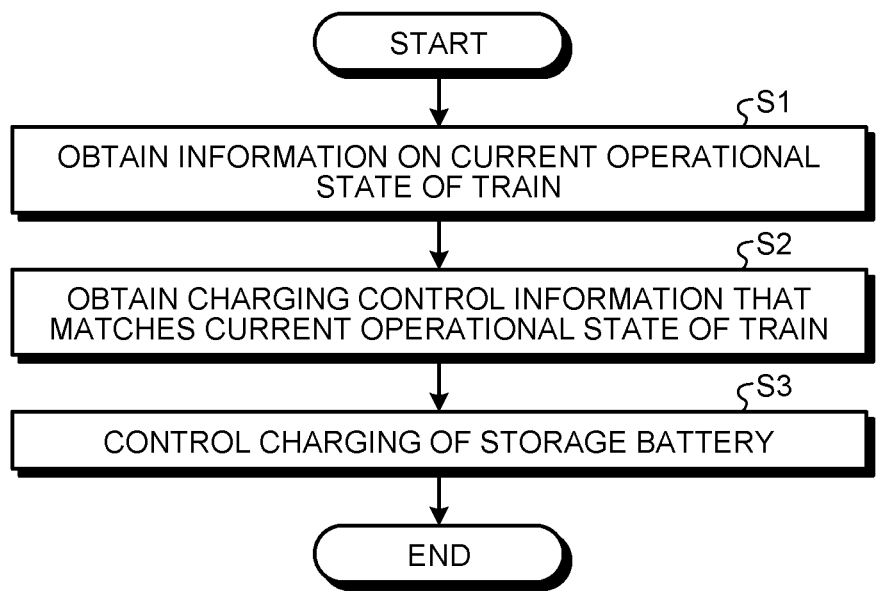
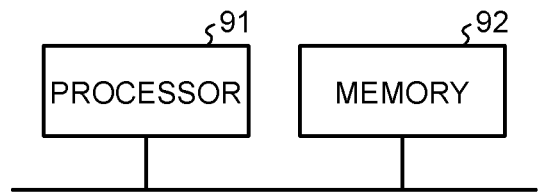
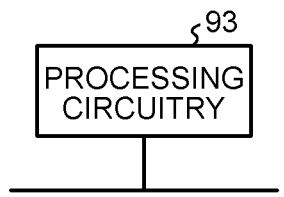

VEHICLE INFORMATION MANAGEMENT DEVICE AND CHARGING CONTROL METHOD

FIELD

The present invention relates to a vehicle information management device to be installed in a train, and relates to a charging control method.

BACKGROUND

In a train, conventionally a storage battery is charged with regenerative power obtained from a regenerative brake. Patent Literature 1 discloses a technique for a vehicle to charge a storage battery with regenerative power when the voltage of the storage battery does not reach a set voltage, and to convert regenerative power into heat and consume the heat when the voltage of the storage battery reaches the set voltage. In Patent Literature 1, the storage battery is operated at a voltage in anticipation of an increase in the voltage due to the regenerative power, so as to minimize the consumption of regenerative power in the form of heat.

CITATION LIST

Patent Literature

Patent Literature 1: Japanese Patent Application Laid-open No. 2009-171772

SUMMARY

Technical Problem

However, in the conventional technique described above, in order that regenerative power is prevented from being consumed in the form of heat, the storage battery needs to be operated at a decreased voltage according to the increase in voltage which occurs when the maximum regenerative power is generated, relative to the maximum operable voltage for the storage battery. Thus, there is a problem that the storage battery needs to be continuously operated without fully utilizing the capacity of the storage battery in the situation where regenerative power is not generated.

The present invention has been achieved to solve the above problems, and an object of the present invention is to provide a vehicle information management device that makes it possible to charge a storage battery in response to an operational state of a train.

Solution to Problem

To solve the above described problems and achieve the object the present invention relates to a vehicle information management device. The vehicle information management device includes: an information obtainer to obtain information on a current operational state of the train; a storage to store charging control information therein, where in the charging control information, control contents of charging the storage battery with power generated by using an engine to be installed in the train are set correspondingly to an operational state of the train; and a controller to obtain charging control information that matches the current operational state of the train from the storage, and to control charging of the storage battery on a basis of the charging control information obtained.

Advantageous Effects of Invention

The vehicle information management device according to the present invention has an effect where it is possible to charge a storage battery in response to an operational state of a train.

BRIEF DESCRIPTION OF DRAWINGS

FIG. 6 is a flowchart illustrating the operation of the vehicle information management device to charge the storage battery with power generated in the generator using an engine.

FIG. 7 is a diagram illustrating an example in which a processing circuitry included in the vehicle information management device is configured by a processor and a memory.

FIG. 8 is a diagram illustrating an example in which the processing circuitry included in the vehicle information management device is configured by dedicated hardware.

DESCRIPTION OF EMBODIMENTS

A vehicle information management device and a charging control method according to embodiments of the present invention will be described in detail below with reference to the accompanying drawings. The present invention is not limited to the embodiments.

Embodiment

Figure 1:
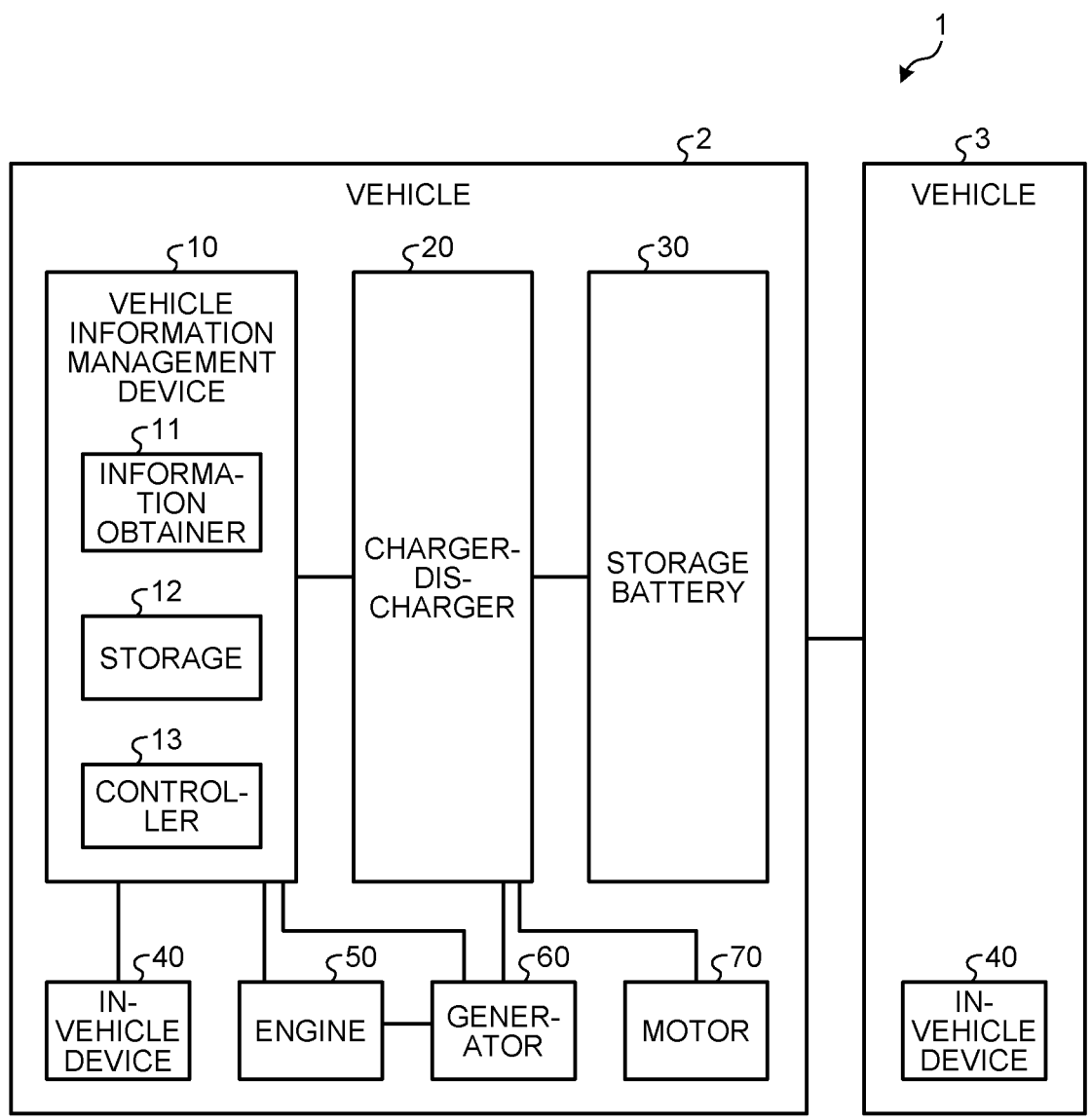
FIG. 1 is a diagram illustrating a configuration example of a train having a vehicle information management device installed therein.

FIG. 1 is a diagram illustrating a configuration example of a train 1 having a vehicle information management device 10 according to an embodiment of the present invention installed in the train 1. The train 1 includes vehicles 2 and 3. While the number of vehicles in the train 1 is two in FIG. 1, this is merely an example. It is allowable that the number of vehicles in the train 1 is three or more. The train 1 also covers a single-vehicle train where the number of vehicles is one. The vehicle 2 includes the vehicle information management device 10, a charger-discharger 20, a storage battery 30, an in-vehicle device 40, an engine 50, a generator 60, and a motor 70.

The vehicle information management device 10 executes control of charging the storage battery 30 with power generated in the train 1. Specifically, the vehicle information management device 10 executes control of generating power by the generator 60 using the engine 50, that is, control of producing electric power. The vehicle information management device 10 executes control of charging the storage battery 30 through the charger-discharger 20: with power generated by the generator 60 using the engine 50; and with regenerative power generated during the deceleration or stopping of the train 1. Regenerative power is generated in the motor 70 when the motor 70 is used as a regenerative brake. The motor 70 is otherwise used for running of the train 1. In the train 1, even though regenerative power is generated in a state where the charging rate of the storage battery 30 is high, all or a part of the regenerative power is converted into heat or the like and wasted without being charged to the storage battery 30. In view of that, in the present embodiment, the vehicle information management device 10 controls charging of the storage battery 30 by determining the control contents in response to the current operational state of the train 1, taking into account the regenerative power generated in the motor 70 and other factors. The vehicle information management device 10 executes control of driving the motor 70 by using power in the storage battery 30 through the charger-discharger 20 such that the motor 70 is used for running of the train 1. For example, the vehicle information management device 10 is a TIMS (Train Information Management System) that manages the operation of the in-vehicle device 40 installed in the vehicles 2 and 3 of the train 1.

Under the control of the vehicle information management device 10, the charger-discharger 20 charges the storage battery 30: with power generated by the generator 60 using the engine 50; and with regenerative power generated when the motor 70 is used as a regenerative brake. Under the control of the vehicle information management device 10, the charger-discharger 0: drives the motor 70 by using power in the storage battery 30; and uses the power in the storage battery 30 for running of the train 1.

The storage battery 30 is charged with power generated in the train 1. As described above, the power generated in the train 1 includes: power generated by the generator 60 using the engine 50; and regenerative power generated when the motor 70 is used as a regenerative brake. The power charged to the storage battery 30 is used for running of the train 1. The power charged to the storage battery 30 is also used by the in-vehicle device 40.

The in-vehicle device 40 is a device installed in the vehicles 2 and 3. The in-vehicle device 40 is installed in each vehicle and is, for example, an air conditioner and a guide display device that shows a stopping station. However, the in-vehicle device 40 is not limited to these devices.

Under the control of the vehicle information management device 10, the engine 50 drives the generator 60. The engine 50 may drive the generator 60 by using power supplied from outside of the train 1, or may drive the generator 60 by using fuel.

The generator 60 is driven by the engine 50. Under the control of the vehicle information management device 10, the generator 60 generates power, that is, produces electric power. The generator 60 charges the storage battery 30 with the generated power through the charger-discharger 20.

The motor 70 is used for running of the train 1. The motor 70 operates as a generator when the motor 70 is used as a regenerative brake to decelerate or stop the train 1, and generates regenerative power. The motor 70 charges the storage battery 30 with the generated regenerative power through the charger-discharger 20.

The configuration of the vehicle information management device 10 is described below. The vehicle information management device 10 includes an information obtainer 11, a storage 12, and a controller 13.

The information obtainer 11 obtains information on the current operational state of the train 1. The information on the current operational state of the train 1 includes the current train location of the train 1, and the current charging rate of the storage battery 30. The information on the current operational state of the train 1 may also include the current passenger load factor of the train 1, the current operating state of the air conditioner in the train 1, and other factors. The information obtainer 11 outputs the obtained information on the current operational state of the train 1 to the controller 13. As described above, in a case where the vehicle information management device 10 is the TIMS, the vehicle information management device 10 has a function of obtaining information on: the current train location of the train 1; the current charging rate of the storage battery 30; the current passenger load factor of the train 1; the current operating state of the air conditioner in the train 1; and other factors.

The storage 12 stores charging control information therein. In the charging control information, the control contents of charging the storage battery 30 with power generated by the generator 60 using the engine 50 installed in the train 1 are set correspondingly to the operational state of the train 1. The control contents are used by the controller 13 to control charging of the storage battery 30. In the present embodiment, the charging rate of the storage battery 30 to be set in the vehicle information management device 10 is described below.

Figure 2:
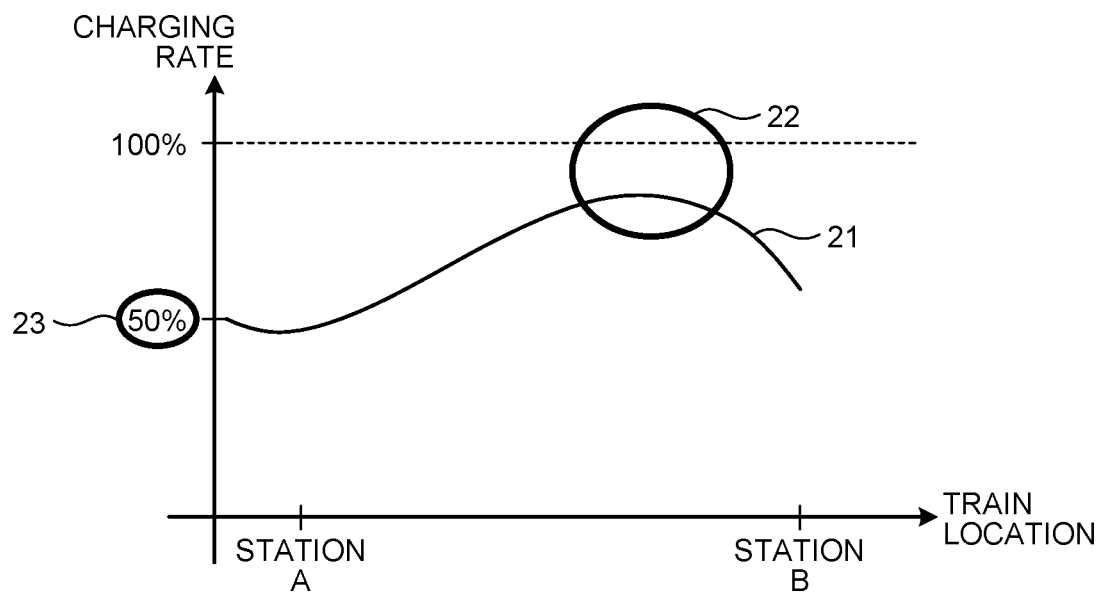
FIG. 2 is a diagram illustrating a first example of a target value for a charging rate of a storage battery when the vehicle information management device charges the storage battery with power generated by a generator.

FIG. 2 is a diagram illustrating a first example of a target value for a charging rate of the storage battery 30 when the vehicle information management device 10 according to the present embodiment charges the storage battery 30 with power generated by the generator 60. In FIG. 2, the horizontal axis represents the train location of the train 1 within the traveling section from a station A to a station B, while the vertical axis represents the charging rate of the storage battery 30. The traveling section of the train 1 is already known. In the traveling section in which the train 1 travels along a downward slope, the storage battery 30 is charged with regenerative power, and consequently a charging rate 21 of the storage battery 30 increases as illustrated in FIG. 2. Thus, in the traveling section in which the train 1 travels along a downward slope, at the point in time when the train 1 departs from the station A, a target value 23 for the charging rate of the storage battery 30 when the storage battery 30 is charged with power generated by the generator 60 is set such that even though the charging rate 21 of the storage battery 30 increases, a peak 22 of the charging rate of the storage battery 30 still does not reach 100%. The target value 23 for the charging rate illustrated in FIG. 2 is set in advance by responsible personnel in a railway company that provides services of the train 1, taking into account: geographical information on the traveling section from the station A to the station B; the vehicle performance of the train 1; and other factors. Examples of the geographical information include a gradient and a curve. It is also allowable to set the target value 23 for the charging rate, taking into account regenerative power to be obtained in the traveling section.

Figure 3:
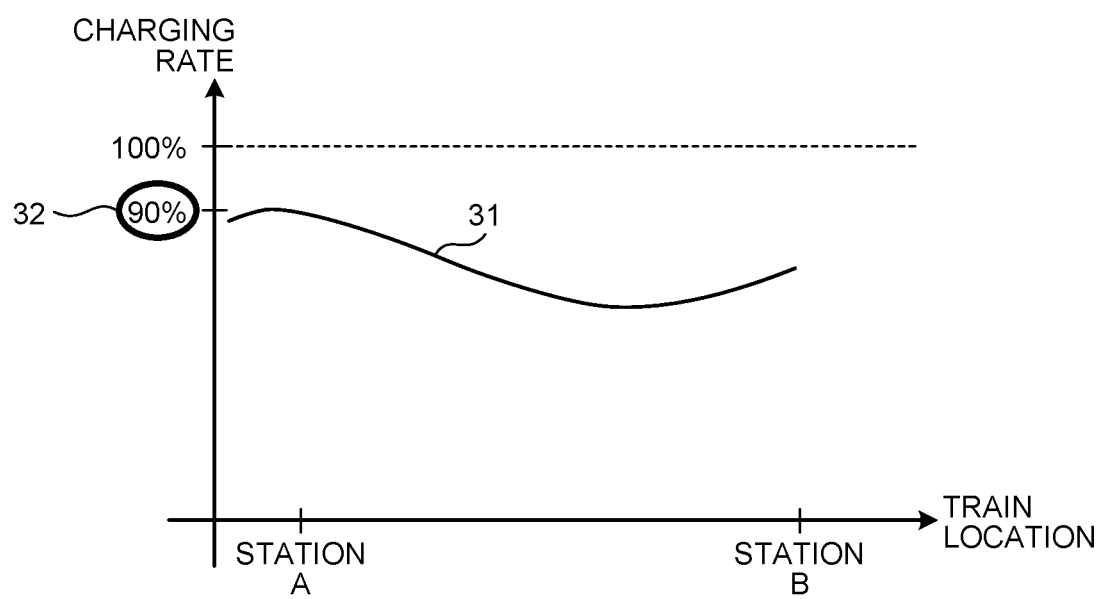
FIG. 3 is a diagram illustrating a second example of a target value for a charging rate of the storage battery when the vehicle information management device charges the storage battery with power generated by the generator.

FIG. 3 is a diagram illustrating a second example of a target value for a charging rate of the storage battery 30 when the vehicle information management device 10 according to the present embodiment charges the storage battery 30 with power generated by the generator 60. In FIG. 3, identically to FIG. 2, the vertical axis represents the charging rate, while the horizontal axis represents the train location. In a traveling section in which the train 1 travels along an upward slope, power in the storage battery 30 is used, and consequently a charging rate 31 of the storage battery 30 decreases as illustrated in FIG. 3. Thus, in the travelling section in which the train 1 travels along an upward slope, at the time point when the train 1 departs from the station A, a target value 32 for the charging rate of the storage battery 30 when the storage battery 30 is charged with power generated by the generator 60 is set higher than the target value in the traveling section in which the train 1 travels along a downward slope. The target value 32 for the charging rate illustrated in FIG. 3 is set in advance by responsible personnel in a railway company that provides services of the train 1, taking into account geographical information on the traveling section from the station A to the station B, the vehicle performance of the train 1, and other factors. It is also allowable to set the target value 32 for the charging rate, taking into account regenerative power to be obtained during the traveling section.

Figures 4, 5:
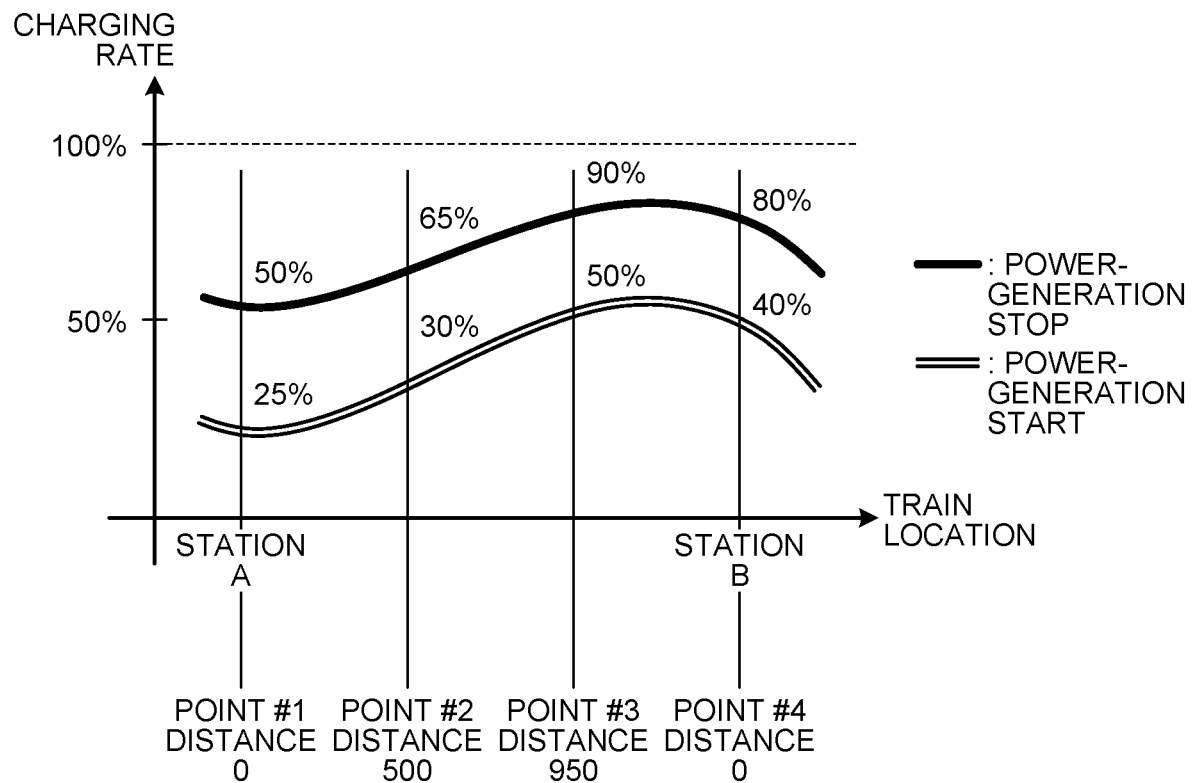
FIG. 4 is a diagram illustrating a third example of a target value for a charging rate of the storage battery when the vehicle information management device charges the storage battery with power generated by the generator.
FIG. 5 is a diagram illustrating the third example of the target value for the charging rate of the storage battery when the vehicle information management device charges the storage battery with power generated by the generator, in a table format.

FIG. 4 is a diagram illustrating a third example of a target value for a charging rate of the storage battery 30 when the vehicle information management device 10 according to the present embodiment charges the storage battery 30 with power generated by the generator 60. In FIG. 4, identically to FIG. 2, the vertical axis represents the charging rate, while the horizontal axis represents the train location. In FIGS. 2 and 3 described above, the target value for the charging rate of the storage battery 30 when the storage battery 30 is charged with power generated by the generator 60 is set at the time point when the train 1 departs from the station A. However, setting of the target value is not limited thereto. Specifically, the target value for the charging rate of the storage battery 30 when the storage battery 30 is charged with power generated by the generator 60 is set correspondingly to the train location of the train 1 between the station A and the station B.

In FIG. 4, the target value for the charging rate of the storage battery 30 is set to 50% at a point #1 of the train location with a distance 0 from the station A. As illustrated in FIG. 4, when the train 1 is at the point #1, as the charging rate of the storage battery 30 decreases to 25%, the generator 60 starts power generation using the engine 50, and when the charging rate of the storage battery 30 increases to 50% as the target value, the generator 60 stops power generation using the engine 50. Likewise, in FIG. 4, the target value for the charging rate of the storage battery 30 is set to 65% at a point #2 of the train location with a distance 500 from the station A. As illustrated in FIG. 4, at the point #2, when the charging rate of the storage battery 30 decreases to 30%, the generator 60 starts power generation using the engine 50, and when the charging rate of the storage battery 30 increases to 65% as the target value, the generator 60 stops power generation using the engine 50. Likewise, in FIG. 4, the target value for the charging rate of the storage battery 30 is set to 90% at a point #3 of the train location with a distance 950 from the station A. As illustrated in FIG. 4, at the point #3, when the charging rate of the storage battery 30 decreases to 50%, the generator 60 starts power generation using the engine 50, and when the charging rate of the storage battery 30 increases to 90% as the target value, the generator 60 stops power generation using the engine 50. Likewise, in FIG. 4, the target value for the charging rate of the storage battery 30 is 80% at a point #4 of the train location with a distance 0 from the station B. As illustrated in FIG. 4, at the point #4, when the charging rate of the storage battery 30 decreases to 40%, the generator 60 starts power generation using the engine 50, and when the charging rate of the storage battery 30 increases to 80% as the target value, the generator 60 stops power generation using the engine 50.

The information in a graph format illustrated in FIG. 4 is listed in a table format in FIG. 5. FIG. 5 is a diagram illustrating the third example of the target value for the charging rate of the storage battery 30 when the vehicle information management device 10 according to the present embodiment charges the storage battery 30 with power generated by the generator 60, in a table format. In FIG. 5, "point" indicates the train location of the train 1 between the station A and the station B. "Station code" indicates the next station at which the train 1 stops. "Distance from station" indicates a distance from the station A in the direction toward the station B. The train location can be identified by using the station code and the distance from station. "Charging rate" indicates a charging rate at which the storage battery 30 starts being charged or a charging rate at which the storage battery 30 stops being charged in accordance with start or stop shown in the field "power generation" next to "charging rate" in FIG. 5. "Power generation" indicates the control contents to be executed by the vehicle information management device 10 when the charging rate of the storage battery 30 reaches the value shown in "charging rate" described above. The information in the table illustrated in FIG. 5 is listed in a unit of station code for the next station at which the train 1 stops. Therefore, the information at the point 4 illustrated in FIG. 4 is described in a table in which information is listed in a unit of station code for the next station from the station B. It is allowable that the storage 12 stores therein charging control information either in a graph format of FIG. 4 or in a table format of FIG. 5. In the charging control information, the control contents by the vehicle information management device 10, when the generator 60 charges the storage battery 30, are set in accordance with the operational state of the train 1. The charging control information illustrated in FIG. 4 or 5 is set in advance by responsible personnel in a railway company that provides services of the train 1, taking into account geographical information on the traveling section from the station A to the station B, the vehicle performance of the train 1, and other factors.

The storage 12 stores therein the charging control information corresponding to the operational state of the train 1. Specifically, the storage 12 stores therein the charging control information illustrated in FIG. 4 or 5 with respect to each information on the operational state obtained by the information obtainer 11. The storage 12 stores therein the charging control information with respect to each passenger load factor of the train 1, for example, when the passenger load factors of the train 1 are 20%, 40%, 60%, 80%, and 100%. This is because the load on the train 1 during traveling differs depending on the passenger load factor, and accordingly the amount of power used from the storage battery 30 differs. The storage 12 also stores therein the charging control information with respect to each operating state of the in-vehicle device 40 in the train 1, for example, an air conditioner. This is because the load on the train 1 during traveling differs depending on the operating state of the air conditioner, for example, a running mode such as heating or cooling, and a set temperature, and accordingly the amount of power used from the storage battery 30 differs. It is allowable that the storage 12 stores therein charging control information in consideration of both the passenger load factor of the train 1 and the operating state of the air conditioner in the train 1. For example, the storage 12 stores therein charging control information when the passenger load factor of the train 1 is 100% and the air conditioner is in operation in the cooling mode at the set temperature of 26° C.

The controller 13 obtains information on the current operational state of the train 1 from the information obtainer 11. The controller 13 obtains charging control information that matches the current operational state of the train 1 from the storage 12. The controller 13 controls charging of the storage battery 30 on the basis of the obtained charging control information.

For example, the information obtainer 11 obtains, as information on the current operational state of the train 1, the current charging rate of the storage battery 30 and the current train location of the train 1. In this case, the controller 13 obtains charging control information that matches the current train location of the train 1 from the storage 12. The controller 13 controls charging of the storage battery 30 by using the obtained charging control information and the current charging rate of the storage battery 30.

The information obtainer 11 obtains, as information on the current operational state of the train 1, the current charging rate of the storage battery 30, the current train location of the train 1, and the current passenger load factor of the train 1. In this case, the controller 13 obtains charging control information that matches the current passenger load factor of the train 1 and the current train location of the train 1 from the storage 12. For example, the controller 13 reads a portion of the charging control information that matches the current passenger load factor of the train 1 as illustrated in the table in FIG. 5. This portion corresponds to the current train location of the train 1. The controller 13 controls charging of the storage battery 30 by using the obtained charging control information and the current charging rate of the storage battery 30.

The information obtainer 11 also obtains, as information on the current operational state of the train 1, the current charging rate of the storage battery 30, the current train location of the train 1, and the current operating state of the air conditioner in the train 1. In this case, the controller 13 obtains charging control information that matches the current operating state of the air conditioner in the train 1 and the current train location of the train 1 from the storage 12. For example, the controller 13 reads a portion of the charging control information that matches the current operating state of the air conditioner in the train 1 as illustrated in the table in FIG. 5. This portion corresponds to the current train location of the train 1. The controller 13 controls charging of the storage battery 30 by using the obtained charging control information and the current charging rate of the storage battery 30.

Next, descriptions are made on the operation of the vehicle information management device 10 to charge the storage battery 30 with power generated by the generator 60 using the engine 50. FIG. 6 is a flowchart illustrating the operation of the vehicle information management device 10 according to the present embodiment to charge the storage battery 30 with power generated by the generator 60 using the engine 50.

In the vehicle information management device 10, the information obtainer 11 obtains information on the current operational state of the train 1 (Step S1). The information obtainer 11 outputs the obtained information on the current operational state of the train 1 to the controller 13. On the basis of the current operational state of the train 1 obtained by the information obtainer 11, the controller 13 obtains charging control information that matches the current operational state of the train 1 from the storage 12 (Step S2). The controller 13 controls charging of the storage battery 30 by using the obtained charging control information and the current charging rate of the storage battery 30 (Step S3).

A specific operation of the controller 13 using the charging control information illustrated in FIGS. 4 and 5 is described below. For example, when the charging rate of the storage battery 30 decreases to 25% at the point #1 in the traveling section from the station A to the station B, the controller 13 outputs a power-generation start command to the engine 50 and the generator 60 to instruct the generator 60 to start power generation using the engine 50. When the engine 50 and the generator 60 receive the power-generation start command from the controller 13, the generator 60 starts power generation using the engine 50. When the charging rate of the storage battery 30 increases due to the power generation by the generator 60 using the engine 50, and consequently the charging rate of the storage battery 30 increases to 50%, then the controller 13 outputs a power-generation stop command to the engine 50 and the generator 60 to instruct the generator 60 to stop power generation using the engine 50. When the engine 50 and the generator 60 receive the power-generation stop command from the controller 13, the generator 60 stops power generation using the engine 50.

Similarly to the above, when the charging rate of the storage battery 30 decreases to 30% at the point #2 in the traveling section from the station A to the station B, then the controller 13 outputs a power-generation start command to the engine 50 and the generator 60. When the engine 50 and the generator 60 receive the power-generation start command from the controller 13, the generator 60 starts power generation using the engine 50. When the charging rate of the storage battery 30 increases due to the power generation by the generator 60 using the engine 50, and consequently the charging rate of the storage battery 30 increases to 65%, then the controller 13 outputs a power-generation stop command to the engine 50 and the generator 60. When the engine 50 and the generator 60 receive the power-generation stop command from the controller 13, the generator 60 stops power generation using the engine 50.

Similarly to the above, when the charging rate of the storage battery 30 decreases to 50% at the point #3 in the traveling section from the station A to the station B, then the controller 13 outputs a power-generation start command to the engine 50 and the generator 60. When the engine 50 and the generator 60 receive the power-generation start command from the controller 13, the generator 60 starts power generation using the engine 50. When the charging rate of the storage battery 30 increases due to the power generation by the generator 60 using the engine 50, and consequently the charging rate of the storage battery 30 increases to 90%, then the controller 13 outputs a power-generation stop command to the engine 50 and the generator 60. When the engine 50 and the generator 60 receive the power-generation stop command from the controller 13, the generator 60 stops power generation using the engine 50.

It is allowable that the storage 12 stores therein charging control information in which many points are set within the traveling section from the station A to the station B illustrated in FIGS. 4 and 5. In this case, the controller 13 may control charging of the storage battery 30 within a traveling section from the first point to the second point, as next to the first point, in accordance with the control contents at the first point.

Next, the hardware configuration of the vehicle information management device 10 is described. In the vehicle information management device 10, the storage 12 is a memory. The information obtainer 11 and the controller 13 are implemented by a processing circuitry. It is allowable that the processing circuitry is either dedicated hardware, or a memory and a processor that executes programs stored in the memory.

FIG. 7 is a diagram illustrating an example in which the processing circuitry included in the vehicle information management device 10 according to the present embodiment is configured by a processor and a memory. In a case where the processing circuitry is configured by a processor 91 and a memory 92, the respective functions of the processing circuitry of the vehicle information management device 10 are implemented in software, firmware, or a combination of the software and the firmware. The software or firmware is described as a program and stored in the memory 92. In the processing circuitry, the processor 91 reads out and executes the program stored in the memory 92 to thereby implement each of the functions. That is, the processing circuitry includes the memory 92 that stores therein programs that eventually execute the processing of the vehicle information management device 10. These programs are also regarded as causing a computer to execute the procedure and method of the vehicle information management device 10.

The processor 91 may be a device such as a CPU (Central Processing Unit), a processing device, an arithmetic device, a microprocessor, a microcomputer, or a DSP (Digital Signal Processor). A nonvolatile or volatile semiconductor memory such as a RAM (Random Access Memory), a ROM (Read Only Memory), a flash memory, an EPROM (Erasable Programmable ROM), and an EEPROM® (Electrically EPROM), or a device such as a magnetic disk, a flexible disk, an optical disk, a compact disk, a MiniDisk, or a DVD (Digital Versatile Disk) corresponds to the memory 92, for example.

FIG. 8 is a diagram illustrating an example in which the processing circuitry included in the vehicle information management device 10 according to the present embodiment is configured by dedicated hardware. When the processing circuitry is configured by dedicated hardware, then for example, a single circuit, a combined circuit, a programmed processor, a parallel-programmed processor, an ASIC (Application Specific Integrated Circuit), an FPGA (Field Programmable Gate Array), or a combination thereof corresponds to a processing circuitry 93 illustrated in FIG. 8. The functions of the vehicle information management device 10 may be implemented by each individual processing circuitry 93 or may be collectively implemented by a single processing circuitry 93.

As for the respective functions of the vehicle information management device 10, it is possible to configure that some parts of the functions are realized by dedicated hardware and other parts thereof are realized by software or firmware. In this manner, the processing circuit can realize each function described above by dedicated hardware, software, firmware, or a combination of these elements.

As described above, according to the present embodiment, the vehicle information management device 10: obtains information on the current operational state of the train 1; and obtains charging control information that matches the current operational state of the train 1 from charging control information in which the control contents of charging the storage battery 30 with power generated by using the engine 50 to be installed in the train 1 are set correspondingly to the operational state of the train 1; so that the vehicle information management device 10 controls charging of the storage battery 30 on the basis of the obtained charging control information. Due to this operation, the vehicle information management device 10 can charge the storage battery 30 in response to the operational state of the train 1. For example, when the train 1 travels along a downward slope, the vehicle information management device 10 can set a target value for a charging rate of the storage battery 30 when the storage battery 30 is charged with power generated by the generator 60 such that the target value is low at a point before the downward slope. Also, when the train 1 travels along an upward slope, the vehicle information management device 10 can set a target value for the charging rate of the storage battery 30 when the storage battery 30 is charged with power generated by the generator 60 such that the target value is high at a point before the upward slope.

The configurations described in the above embodiments are only examples of the content of the present invention. The configurations can be combined with other well-known techniques, and part of each of the configurations can be omitted or modified without departing from the scope of the present invention.

REFERENCE SIGNS LIST 1 train, 2, 3 vehicle, 10 vehicle information management device, 11 information obtainer, 12 storage, 13 controller, 20 charger-discharger, 30 storage battery, 40 in-vehicle device, 50 engine, 60 generator, 70 motor.

The invention claimed is:

1. A vehicle information management device that executes control of charging a storage battery with power generated in a train, the vehicle information management device comprising:
   an information obtainer to obtain information on a current operational state of the train;
   a storage to store charging control information therein, where in the charging control information, control contents of charging the storage battery with power generated by an engine installed in the train are set correspondingly to an operational state of the train; and
   a controller to obtain charging control information that matches the current operational state of the train from the storage, and to control charging of the storage battery on a basis of the charging control information obtained, wherein
   the information obtainer obtains, as information on the current operational state of the train, a current charging rate of the storage battery, a current train location of the train, and a current passenger load factor of the train; and
   the controller obtains charging control information that matches the current passenger load factor of the train and the current train location of the train from the storage, and controls charging of the storage battery by using the charging control information obtained and the current charging rate of the storage battery.

2. A charging control method for a vehicle information management device that executes control of charging a storage battery with power generated in a train, the charging control method comprising:
   a first step of obtaining information on a current operational state of the train by an information obtainer;
   a second step of obtaining charging control information that matches the current operational state of the train by a controller from a storage to store charging control information therein, where in the charging control information, control contents of charging the storage battery with power generated by an engine installed in the train are set correspondingly to an operational state of the train; and a third step of controlling charging of the storage battery by the controller on a basis of the charging control information obtained, wherein at the first step, the information obtainer obtains, as information on the current operational state of the train, a current charging rate of the storage battery, a current train location of the train, and a current passenger load factor of the train;

at the second step, the controller obtains charging control information that matches the current train location of the train and the current passenger load factor of the train from the storage; and at the third step, the controller controls charging of the storage battery by using the charging control information obtained and the current charging rate of the storage battery.

* * * * *